Patented May 13, 1952

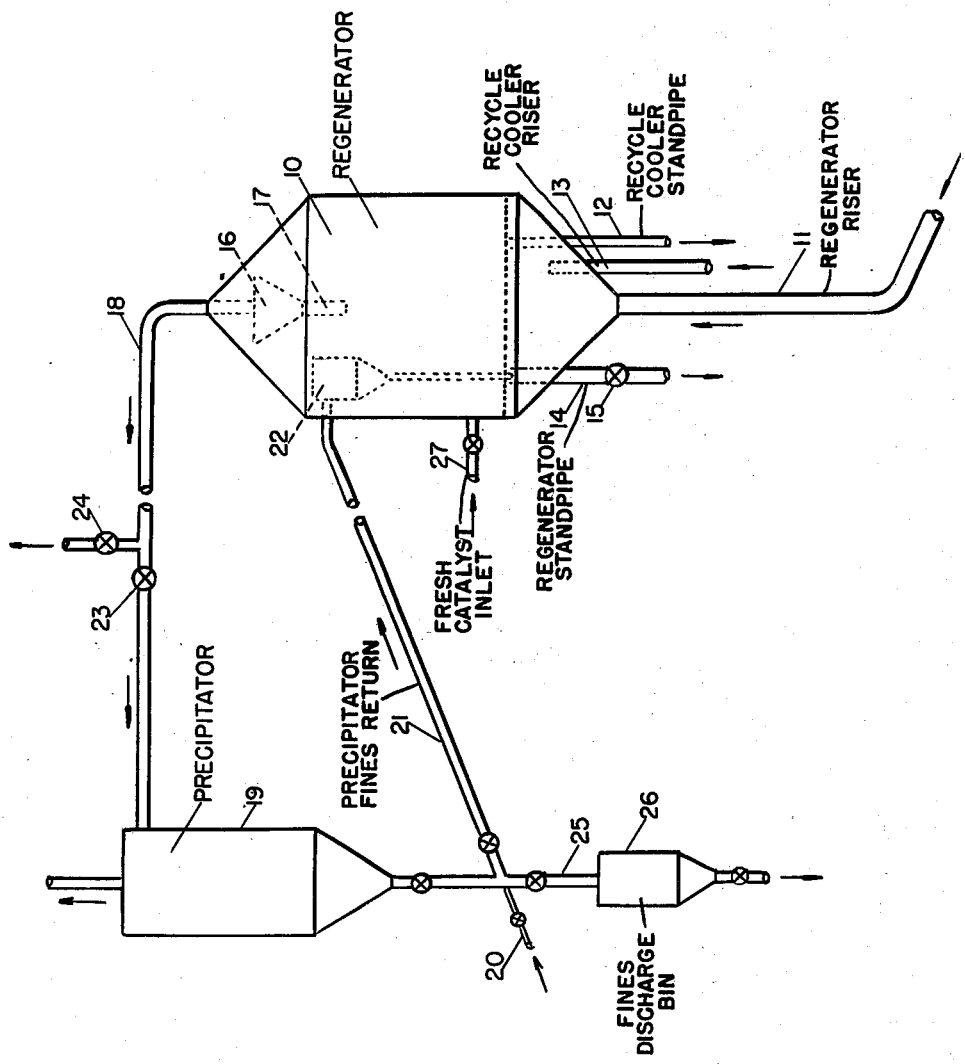

2,596,748

UNITED STATES PATENT OFFICE 2,596,748

CATALYST REGENERATION SYSTEM

Kenneth M. Watson, Madison, Wis., and Robert Lormer Smith, Western Springs, Ill., assignors to Sinclair Refining Company, New York, N. Y., a corporation of Maine Application July 10, 1948, Serial No. 38,146

2 Claims. (Cl. 252—417)

This invention relates to the regeneration of finely divided solid catalysts of the type used in so-called fluid catalytic processes. More particularly, this invention relates to selective replacement of low grade catalyst in a fluid catalytic process of the type employed in the pyrolytic conversion of petroleum by controlled elimination of catalyst fines from the regeneration zone in correlation with periodic addition of fresh catalyst.

In petroleum conversion processes of the type contemplated by this invention a finely divided catalyst is suspended in oil vapors, at elevated temperature, and the suspension is passed to a reaction zone in which conversion of the oil occurs. The spent catalyst is separated from the oil vapors, stripped of oil and regenerated by burning off the coke or carbon deposited thereon in a regeneration zone in the presence of air or other oxidizing gas. The regenerated catalyst is then returned to the process by re-suspension in the oil vapor feed. This general type of process is commonly termed a fluid catalytic cracking process, and catalysts useful therein are termed fluid catalysts.

The catalyst used in fluid cracking processes is a very finely divided solid material, which may be a naturally occurring clay type material or a synthetic powder of silica-alumina or silica-magnesia composition. A typical natural catalyst consists of material ground to a powder comprising a range of sizes of which approximately 30% is smaller than 20 microns in size. A synthetic catalyst, similarly comprises a powder of a range of sizes of which approximately 10% is normally smaller than 20 microns. The proportion of particles in the fines range, moreover, increases in the course of continued cycles of reaction and regeneration due to mechanical attrition and erosion.

In the regeneration cycle sizable proportions of catalyst fines are carried overhead from the regeneration zone by means of the combustion and fluidizing gases. Conventionally, a system of cyclone air separators is provided to knock out the heavier particles and return them to the regeneration zone. The suspended fines are further subjected to concentrating techniques as by electrostatic precipitation or through multistage centrifugal separation to recover additional catalyst.

In maintaining the desired catalyst inventory in the system, the catalyst lost as fines must be replaced with make-up catalyst. In addition, individual particles of the circulating catalyst charge are gradually deactivated through continued cycles of reaction and regeneration beyond the power of regeneration. Replacement of incidental catalyst losses with make-up catalyst ordinarily will not both replace the lost catalyst values and compensate for catalyst degradation. In conventional operations, therefore, catalyst rejection is effected by increasing the incidental loss of fines to the make-up rate, or by supplementing incidental losses with the withdrawal of a gross portion of the circulating catalyst. It is obviously a desideratum of the catalyst replacement operation to restrict catalyst rejection to that portion of the charge having a minimum activity in order to minimize make-up requirements and yet maintain a high level of catalyst activity with the attendant economic advantages of improved product distribution and quality.

Conventional fines rejection, however, has the disadvantage of indiscriminately rejecting much high grade catalyst, especially when the fresh catalyst contains a large proportion of fines as in the case of natural clay catalyst. Virgin catalyst fines have an activity equal to or better than the over-all average of the fresh catalyst, and where catalyst is rejected solely through rejection of fines, the rejected material will include particles of high catalyst value, particularly since oil-catalyst and air-catalyst contact is better with the finer particles. Therefore, the fines operate more efficiently in the reaction-regeneration cycle, at least in the earlier periods of circulation. We have discovered, however, that the average activity of the fines fractions falls off more rapidly than that of the heavier fractions over the normal period of operation. The effect of erosion and attrition in breaking down large particles, combined with the effect of gradual sintering through repeated regeneration which is more marked with finer particles, cumulatively increases the amount of total fines and the proportion of low activity fines in the fines fraction. Besides, the effect of gradual sintering in increasing the proportion of low activity fines in the circulating catalyst, the finer particles are more susceptible to sintering through abnormal causes such as afterburning, for the finer particles tend to have a longer residence time in the zone of incandescence resulting from afterburning than the larger particles. Hence in continuous operation, catalyst degradation is reflected more markedly in the fines fractions than in the over-all catalyst.

We have found that a given average catalyst activity can be maintained with a smaller make-up rate of fresh catalyst or a higher level of activity can be maintained with a fixed rate of make-up by providing periodic addition of make-up catalyst and by correlating the rejection of fines with the time of fresh catalyst addition. In our method of regeneration, the system is operated for maximum retention of fines during the beginning and major portion of any operating period during and following the addition of fresh make-up catalyst to the system until a period prior to the next time for adding make-up. When catalyst inventory and average activity has dropped so that fresh catalyst should be added to the system, the suspending fines passing overhead from the regeneration zone are totally rejected from the system as by venting to the atmosphere.

Fresh catalyst ordinarily should be added batchwise at intervals of 10 days or more depending upon the equilibrium activity that is to be maintained in the system. Immediately after the addition of a batch of fresh catalyst the electrostatic precipitation unit or other fines concentrating means is operated for maximum retention of fines and the concentrated fines fraction is then returned, advantageously with a minimum quantity of carrying air to a small auxiliary cyclone in the regeneration zone having a dip-leg which discharges directly into the regenerator standpipe in order to insure return of the fines to the reactor circulating system. In conventional practice, the recovered fines are picked up by an air stream and blown into the aerated bed of the regenerator at a low level so that a cycle of finely divided material may be established through the concentrating unit into the regenerator and back without ever reaching the reactor system. This operation is continued until a short time before the inventory is so depleted that a fresh charge of make-up catalyst must be added. Now the fines concentrating unit may be profitably shut down, and the fines stream rejected from the system until the proportion of fines in the circulating catalyst charge has been substantially reduced or until the catalyst inventory has been lowered sufficiently so that the desired activity level will be regained after make-up. For example, the fines rejected at the end of a period of 10 days of operation without fresh catalyst addition may show an activity index by the D & L method as low as 20, whereas the average activity of the entire charge of catalyst has fallen to only 27. The addition of fresh catalyst will raise the activity to 33, which will gradually decline during the next cycle of operation. By this method the fines rejected are all deactivated by continual service during the period following the previous catalyst addition and do not include fresh catalyst, which has not performed reactor service.

Our invention will be further illustrated by reference to the drawing which represents schematically the regeneration cycle. Circulating catalyst enters regenerator 10 from the reaction zone through regenerator riser 11, and is reactivated by combustion of the adherent carbonaceous matter by means of air or other oxidizing gas, which is ordinarily provided by direct addition to the regenerator. A constant temperature is maintained in the regenerator by recycling a portion of the regenerated catalyst through extraneous coolers (not shown) by means of recycle standpipe 12 and recycle riser 13. Regenerated catalyst is returned to the reaction zone through regenerator standpipe 14 at a rate controlled by a valve 15, ordinarily a slide valve. The combustion gases arising from the regenerator pass overhead through a nest of cyclone or centrifugal air separators 16 in which the heavier particles drop out and are returned through a common drop-leg 17. The unrecovered fines suspended in the combustion gases pass from the cyclones through overhead line 18, and thence advantageously through coolers (not shown) in order to recover the sensible heat content by generation of steam in a waste boiler. From the coolers the stream of fines passes to a secondary fines concentrating unit 19 which may be an electrostatic precipitating unit of the Cottrell type. The concentrate from this unit is returned to the system by line 21 to auxiliary cyclone 22 situated in the regenerator, advantageously in a carrier air stream of minimum quantity introduced as at 20. The drop-leg from auxiliary cyclone 22 directly feeds into regenerator standpipe 14. During catalyst addition and for a normal operating period thereafter, the regenerator fines follow this flow. For a short period immediately prior to the addition of make-up catalyst the stream of fines passing from cyclones 16 may be vented from the system at a point beyond the coolers by closing valve 23 and opening valve 24 in the fines overhead line 18. Of course, if atmospheric contamination is a significant factor, the fines may be further concentrated before venting unrecovered material to the atmosphere. For example, the fines may be collected in the precipitator as during normal operation, and then discharged through line 25 into a bin or hopper 26 instead of being returned to the system.

Fresh catalyst is added to the system by conventional methods, usually from a fresh catalyst storage hopper into the regenerator 10 as at 27 by means of a dust pump or screw conveyor. Although the make-up is added batchwise, the rate of addition should be controlled in order to maintain temperature control within the system. It should be noted that batch addition of fresh catalyst besides providing a basis for selective rejection of low activity catalyst fines has the inherent effect of increasing average activity slightly for a given replacement rate.

As noted above, any convenient means for concentrating and retaining the maximum amount of fines may be utilized. In commercial practice electrostatic precipitation units of the Cottrell type have proved popular for this purpose, but multi-stage centrifugal air separation units may be used.

Our method of catalyst replacement by selective rejection of catalyst fines may be profitably combined with systems for continuously or intermittently rejecting selected fractions of large, dense catalyst particles of sub-average catalyst activity from the circulating catalyst mass as described in the co-pending application of Howe, Smith, and Watson, Serial No. 38,145, filed July 10, 1948. By means of this combination a higher level of average catalyst activity may be maintained with lower make-up requirements than in usual practice.

We claim:

1. In the normal operation of catalytic processes in which a feed of constant composition is subjected to contact with a finely divided solid catalyst to yield a resulting conversion product of substantially constant composition where the catalyst is continuously regenerated by combustion of adherent carbonaceous matter without substantially varying the degree to which the carbonaceous matter is removed from the catalyst by such combustion and where catalyst inventory is maintained in the system by periodic addition of fresh make-up catalyst, the improvement in the control of catalyst inventory which comprises adding fresh make-up catalyst to the system for a brief period relative to the normal operating period, returning substantially all of the catalyst fines carried overhead from the regenerating zone to the system during said make-up period and for the period of normal operation immediately thereafter until catalyst inventory and average activity have dropped so that fresh catalyst should be added to the system, and thereupon rejecting said overhead fines from the system for a relatively brief period immediately prior to the succeeding periodic addition of make-up catalyst said operation being carried out with no make-up catalyst being added during the normal operating period and the catalyst fines rejection period.

2. The improvement of claim 1 in which the fines returned to the system are concentrated and directly introduced to the regenerator standpipe returning regenerated catalyst to the reaction zone.

KENNETH M. WATSON.
ROBERT LORMER SMITH.

REFERENCES CITED

The following references are of record in the file of this patent:

UNITED STATES PATENTS

| Number | Name | Date |
|---|---|---|
| 2,311,564 | Munday | Feb. 16, 1943 |
| 2,325,611 | Keranen | Aug. 3, 1943 |
| 2,337,684 | Scheineman | Dec. 28, 1943 |
| 2,391,334 | Nicholson | Dec. 18, 1945 |
| 2,410,284 | Gunness et al. | Oct. 29, 1946 |
| 2,419,098 | Stratford et al. | Apr. 15, 1947 |
| 2,420,049 | Martin | May 6, 1947 |
| 2,420,632 | Tyson | May 13, 1947 |
| 2,421,664 | Tyson | June 3, 1947 |
| 2,429,127 | Graham et al. | Oct. 14, 1947 |
| 2,430,015 | Hatton et al. | Nov. 4, 1947 |
| 2,434,567 | Jahnig et al. | Jan. 13, 1948 |
| 2,445,351 | Gohr | July 20, 1948 |